United States Patent
Haverkamp

(10) Patent No.: US 7,040,752 B2
(45) Date of Patent: May 9, 2006

(54) SPECTACLES, PARTICULARLY RIMLESS DRILLED-LENS SPECTABLES

(75) Inventor: Helmut Haverkamp, Hünxe (DE)

(73) Assignee: Dr. Eugen Beck GmbH & Co., Oelde (DE)

( * ) Notice: Subject to any disclaimer, the term of this patent is extended or adjusted under 35 U.S.C. 154(b) by 3 days.

(21) Appl. No.: 10/486,631

(22) PCT Filed: Nov. 14, 2002

(86) PCT No.: PCT/EP02/12748

§ 371 (c)(1),
(2), (4) Date: Feb. 11, 2004

(87) PCT Pub. No.: WO03/107074

PCT Pub. Date: Dec. 24, 2003

(65) Prior Publication Data

US 2004/0183995 A1    Sep. 23, 2004

(30) Foreign Application Priority Data

Jun. 13, 2002   (DE) ............... 202 09 155 U

(51) Int. Cl.
*G02C 5/02*   (2006.01)
(52) U.S. Cl. ............... 351/110; 351/124
(58) Field of Classification Search ......... 351/110, 351/124, 41, 153, 158
See application file for complete search history.

(56) References Cited

U.S. PATENT DOCUMENTS

| | | | |
|---|---|---|---|
| 2,588,505 A | 3/1952 | Ellis | |
| 5,659,380 A | 8/1997 | Kobayashi | |
| 5,684,559 A | 11/1997 | Lin | |
| 5,748,280 A * | 5/1998 | Herman | 351/110 |
| 6,070,978 A | 6/2000 | Temming | |
| 6,705,723 B1 * | 3/2004 | Lavie | 351/110 |
| 6,860,597 B1 * | 3/2005 | Carlon | 351/110 |

FOREIGN PATENT DOCUMENTS

| | | |
|---|---|---|
| DE | DD 372 | 3/1952 |
| DE | DD 2062 | 12/1953 |
| DE | 923812 | 2/1955 |
| DE | 925915 | 3/1955 |
| DE | 85 26 267 | 1/1986 |
| DE | 29515998 | 1/1996 |
| DE | 299 01 347 | 1/2000 |
| DE | 299 19 039 | 10/2000 |
| DE | 200 02 863 | 5/2001 |
| EP | 0643316 | 3/1995 |
| FR | 607214 | 6/1926 |
| WO | WO97 21133 | 11/1996 |

* cited by examiner

*Primary Examiner*—Hung Xuan Dang
(74) *Attorney, Agent, or Firm*—Collard & Roe, P.C.

(57) ABSTRACT

A set of eyeglasses that are in the form of rimless drill mounted eyeglasses wherein the eyeglass lenses have through bores on the outer edges for accommodating regions of the bridge or the temples. These temple wires can comprise an element of the temple hinge. In this case, the ends of the bridge and the ends of the temples or frame elements are supposed to be attached so that they can hardly be perceived. This design is achieved so that each through bore for the bridge or temple elements has two additional through bores assigned to it for passing through a plastic filament that fixes these elements in place in the eyeglass lens.

2 Claims, 2 Drawing Sheets

SPECTACLES, PARTICULARLY RIMLESS DRILLED-LENS SPECTABLES

CROSS REFERENCE TO RELATED APPLICATIONS

Figure 1:
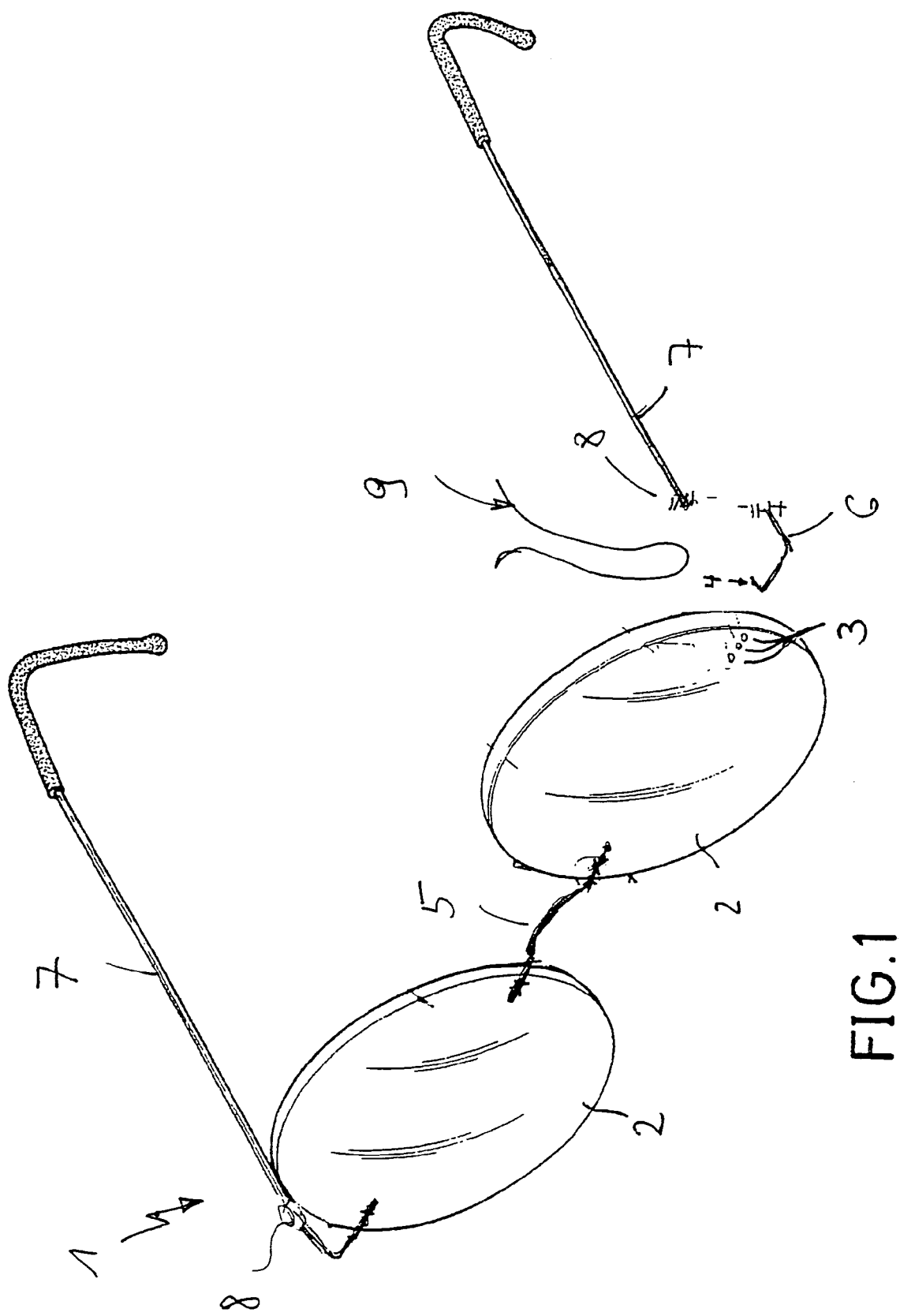

Applicant claims priority under 35 U.S.C. §119 of German Application No. 202 09 155.4 filed on Jun. 13, 2002. Applicant also claims priority under 35 U.S.C. §365 of PCT/EP02/12748 filed on Nov. 14, 2002. The international application under PCT article 21(2) was not published in English.

The invention relates to eyeglasses, particularly rimless, drill-mount eyeglasses, whereby the eyeglass lenses are provided with through-bores on the outer edges for accommodating regions of the bridge or of end pieces that comprise an element of the temple hinge.

There are different eyeglass configurations, where the eyeglass lenses might be accommodated in a complete eyeglass frame, or where only parts of the frame are configured, and the eyeglass lenses are generally held in approximately arc-shaped frame parts by means of nylon filaments or the like, such as described, for example, in DD-372, DD-2062, DE-85 26 267-U, DE-299 19 039-U, or DE-200 02 863-U.

Attachments by way of metal wires are shown in U.S. Pat. No. 5,748,280, U.S. Pat. No. 6,070,978, or DE-295 15 008-U, whereby there are also so-called frameless or glass-only eyeglasses, in which the bridge and the temples that carry the lens-holding frame parts, with the corresponding hinge elements, are screwed into bores in the lens. Such a construction is known, for example, from DE-299 01 347-U. Modified versions are shown, for example, by U.S. Pat. No. 2,588,505, U.S. Pat. No. 5,659,380, U.S. Pat. No. 5,684,559, FR-607 214, or WO 97/21133, to mention only a few examples.

Attaching the frame elements directly to the eyeglass lenses by means of screws does lead to very good results, but an effort is always made to achieve attachment of the frame elements in as invisible a manner as possible.

This is the point from which the invention proceeds, which has as its task to achieve an attachment of the ends of the bridge, on the one hand, and of the temples, i.e. the frame parts that accommodate the lens, on the other hand, that can barely be perceived optically.

In the case of eyeglasses of the type stated initially, this task is accomplished, according to the invention, in that each through-bore for the bridge or temple elements has two additional through-bores assigned to it, for passing through a plastic filament that fixes these elements in place on the eyeglass lens.

Fixation of the frame elements using plastic filaments, for example nylon filaments, opens up the possibility of an extremely reticulated configuration of glass-only eyeglasses, since the attachment elements are hardly visible at all. Because of the possibility of using transparent plastic filaments, this effect is additionally supported.

Embodiments of the invention are evident from the dependent claims. In this connection, it can be provided that the through-bores are arranged in alignment, whereby the bore that is farthest from the edge of the glass forms the holder for an angled end of the wire that forms the temples or the bridge, and the other through-bores serve to pass through the fixation filament and to accommodate the fixation knot.

Another embodiment of the invention consists of the fact that the bore that is adjacent to the holder bore for the wire ends has a region having a smaller diameter and a region having a greater diameter, to accommodate the fixation filament knot. This configuration makes it possible to provide an easily enlarged drilled region in the eyeglass lens, in which the end knot of the fixation filament can be positioned, so that no part of the filament projects beyond the outside contour of the eyeglass lenses that have been fixed in place.

Very firm fixation of the wire end on the eyeglass lens, in each instance, can be achieved in that during fixation of the wire end that is inserted into the through-bore, the fixation filament loops around the wire in the region of the outer edge of the eyeglass lens, passes through the first through-bore as a double filament, in the side of the eyeglass lens that faces away from the wire, passes by the inserted wire on both sides, runs into the other through-bore after forming a filament X on both sides, outside on the wire, and is knotted in that through-bore, forming the tension that is necessary for fixation.

Other characteristics, details, and advantages of the invention are evident from the following description, as well as on the basis of the drawing. This shows, in FIG. 1 a simplified spatial view of a pair of eyeglasses according to the invention, with the nosepiece fixed in place and loose, as well as in FIG. 2 four steps of the knotting and fixation technique of the attachment wire in the edge region of the eyeglass lens.

Figure 2:
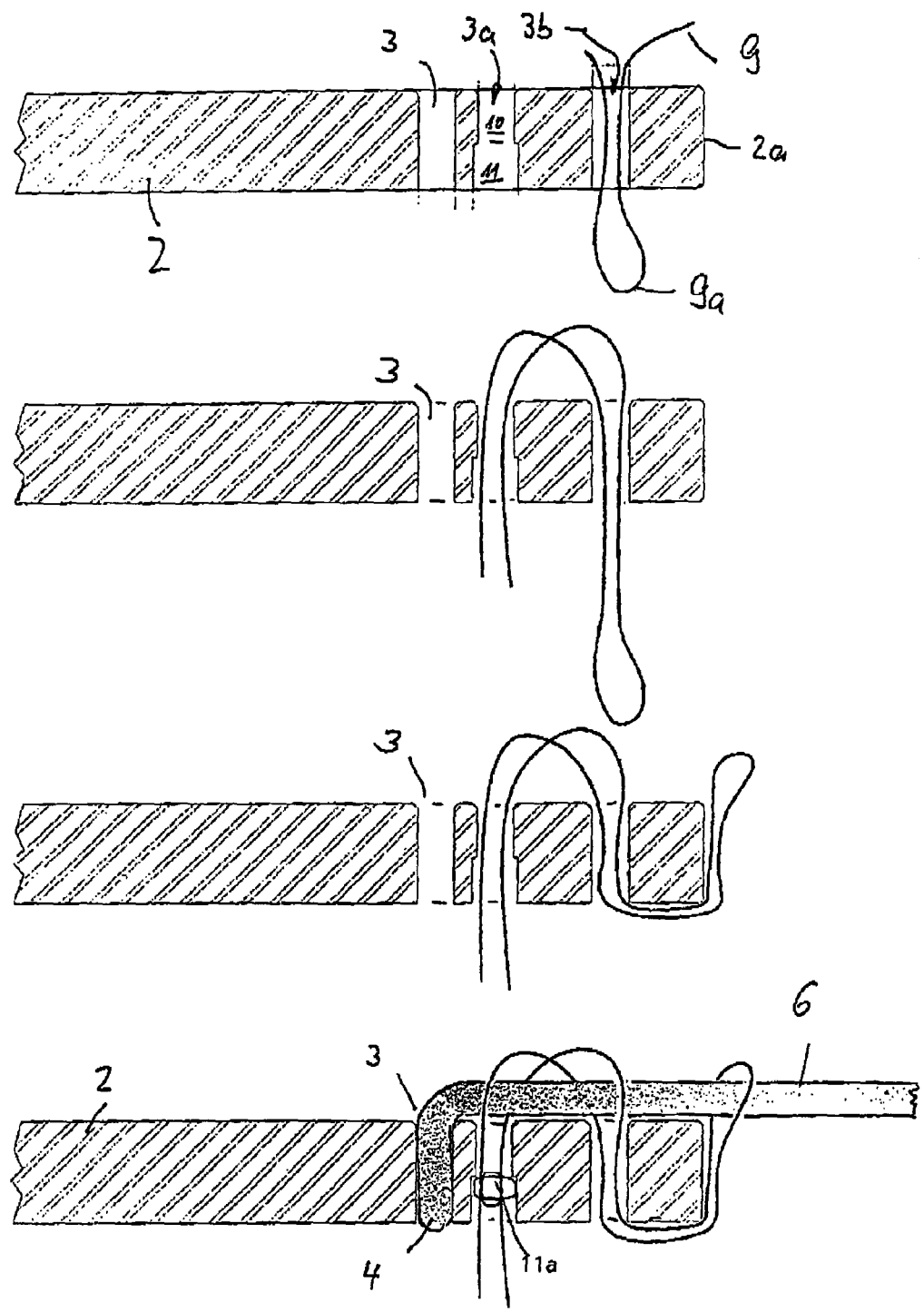

The eyeglasses designated as a whole as 1 are configured as so-called glass-only eyeglasses, i.e. the lenses designated as 2 do not have any frame that holds them, rather each eyeglass lens is equipped with three through-bores, designated in general as 3, on the outer edge, whereby these through-bores are designated as 3, 3*a*, and 3*b* in FIG. 2, for a better understanding. These through-bores serve, among other things, to accommodate an angled end 4, whether of the bridge indicated as 5 or of the element indicated as 6 of the frame part 7 in front of a hinge 8, not shown in detail, the configuration of which is not important here.

In this connection, the bridge 5 or the hinge element 6, respectively, is fixed in place on the eyeglass lens 2 by means of a nylon filament 9, specifically in the manner shown in FIG. 2. First, a looped end of the nylon filament 9 is passed through the bore 3*b* that lies closest to the outer edge 2*a* of the eyeglass lens 2, the filaments are looped in an X on the surface of the lens 2 and passed through the adjacent bore 3*a*. The loop that is formed is then looped around the outer edge 2*a* of the eyeglass lens 2, as is evident from FIG. 2, third segment. Now the bridge or the corresponding element 6, for example, respectively, is threaded through and inserted into the inner bore 3 with its angled end 4, the filament is pulled taut, and knotted.

As is particularly evident from FIG. 2, the throughbore 3*a* is configured in stepped manner, i.e. it has a region having a smaller diameter 10, which is positioned in the direction of the outside of the eyeglass lens, and a region having a larger diameter, designated in general as 11, which serves to accommodate the knot 11*a*.

Of course the exemplary embodiment of the invention can be modified in many different ways, without leaving the basic idea of the invention. For example, a small disk can subsequently be pushed over the two filament ends to be knotted, which lies against the edge of the transition from the bore region 11 to the bore region 10, in order to fix the knot in place more firmly, and the bridge shapes can have any type that is usual for eyeglasses, as can the hinges, and the like.

The invention claimed is:

1. A set of rimless eyeglasses comprises:
   a) a plurality of eyeglass lenses having a plurality of outer edges wherein said eyeglass lenses have through bores disposed on said outer edges of said lenses, wherein each lens of said plurality of lenses has a plurality of through bores;
   b) a plurality of eyeglass elements comprising:
      i) a bridge extending between said lenses and coupled to said lenses in at least one through bore of said lenses; and
      ii) at least one temple hinge coupled to at least one eyeglass lens in at least one through-bore of said at least one lens; and
   c) at least one filament extending through at least one through bore, said filament for coupling at least one of said plurality of eyeglass elements to at least one of said lenses,
   wherein said plurality of through bores in each lens includes a holder bore, a bore formed in a stepped manner, and at least one additional bore, wherein said stepped bore has a region having a smaller diameter and a region having a larger diameter to accommodate a filament knot; and
   wherein at least one eyeglass element is inserted into said holder bore and wherein said at least one filament loops around said eyeglass element in a region of said outer edge of said eyeglass lens and passes through said at least one additional bore as a double filament on a side of said eyeglass lens that faces away from said eyeglass element, and extends into said additional through bore after forming a criss-cross outside on said at least one eyeglass element and is knotted on said stepped bore forming a tension that is sufficient for fixation.

2. The eyeglasses as in claim 1, wherein in each eyeglass lens, said through bores are arranged in alignment with at least one through bore being positioned farthest from an edge of each lens for receiving at least one of said plurality of eyeglass elements, and wherein remaining through-bores are used to receive said filament and are adapted to receiving a fixation knot.

* * * * *